(12) United States Patent
Maruyama et al.

(10) Patent No.: US 10,704,603 B2
(45) Date of Patent: Jul. 7, 2020

(54) METHOD OF ASSEMBLING TAPERED ROLLER BEARING, AND JIG FOR USE IN THE METHOD

(71) Applicant: JTEKT CORPORATION, Osaka-shi, Osaka (JP)

(72) Inventors: Masahiro Maruyama, Yao (JP); Akiyuki Suzuki, Nagoya (JP); Ryo Shiina, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 71 days.

(21) Appl. No.: 15/900,279

(22) Filed: Feb. 20, 2018

(65) Prior Publication Data
US 2018/0252268 A1    Sep. 6, 2018

(30) Foreign Application Priority Data

Mar. 3, 2017    (JP) ................................ 2017-040523

(51) Int. Cl.
| F16C 43/06 | (2006.01) |
| B25B 27/06 | (2006.01) |
| B23P 15/00 | (2006.01) |
| F16C 19/36 | (2006.01) |
| F16C 33/36 | (2006.01) |
| F16C 33/46 | (2006.01) |

(52) U.S. Cl.
CPC .......... *F16C 43/065* (2013.01); *B23P 15/003* (2013.01); *B25B 27/06* (2013.01); *F16C 19/364* (2013.01); *F16C 33/366* (2013.01); *F16C 33/467* (2013.01); *F16C 43/06* (2013.01)

(58) Field of Classification Search
CPC ...... F16C 43/065; F16C 43/06; F16C 19/364; F16C 33/467; F16C 33/366; B25B 27/06; B23P 15/003
See application file for complete search history.

(56) References Cited

U.S. PATENT DOCUMENTS 7,757,402 B2 * 7/2010 Seo ....................... F16C 19/386
                                                        29/898.07

FOREIGN PATENT DOCUMENTS

JP    2016-053422 A    4/2016

* cited by examiner

*Primary Examiner* — Rick K Chang
(74) *Attorney, Agent, or Firm* — Oliff PLC

(57) ABSTRACT

A cage assembly is moved in the axial direction to approach an inner ring from a small rib portion side. An inner ring assembly is constituted by causing tapered rollers of the cage assembly to climb over a small rib portion to be fitted on an inner raceway surface, and then is assembled to an outer ring. In this method, a jig is provided adjacent to the small rib portion. The jig includes recessed grooves that are formed in the outer peripheral portion of the jig and that enable contact of the respective tapered rollers. Each recessed groove has a recessed arcuate shape in cross section. The tapered rollers of the cage assembly are caused to slide radially outward along the recessed grooves, so that the diameter of cage is increased. Accordingly, the tapered rollers climb over the small rib portion to be fitted on the inner raceway surface.

8 Claims, 9 Drawing Sheets

OTHER SIDE IN
AXIAL DIRECTION

ONE SIDE IN
AXIAL DIRECTION

US 10,704,603 B2

METHOD OF ASSEMBLING TAPERED ROLLER BEARING, AND JIG FOR USE IN THE METHOD

INCORPORATION BY REFERENCE

The disclosure of Japanese Patent Application No. 2017-040523 filed on Mar. 3, 2017 including the specification, drawings and abstract, is incorporated herein by reference in its entirety.

BACKGROUND OF THE INVENTION

1. Field of the Invention

The present invention relates to a method of assembling a tapered roller bearing, and to a jig for use in the method.

2. Description of the Related Art

Tapered roller bearings can support a large radial load and also an axial load, and thus are widely used in various fields. A tapered roller bearing includes an inner ring, an outer ring, a plurality of tapered rollers, and an annular cage. The inner ring has a tapered inner raceway surface on the outer peripheral side. The outer ring has a tapered outer raceway surface on the inner peripheral side. The tapered rollers make rolling contact with the inner raceway surface and the outer raceway surface. The cage holds the tapered rollers. A cone front face rib portion (hereinafter referred to as a "small rib portion") and a cone back face rib portion (hereinafter referred to as a "large rib portion") that project radially outward are provided on both sides of the inner raceway surface of the inner ring. The small rib portion and the large rib portion hold the tapered rollers therebetween to prevent the tapered rollers from slipping off in the axial direction. An axial load can be supported with the tapered rollers contacting a side surface of the large rib portion. The cage has annular portions on both sides in the axial direction, and a plurality of cage bars that connect between the annular portions. Spaces in the cage between the annular portions on both sides and between cage bars that are adjacent to each other in the circumferential direction constitute pockets that house the tapered rollers.

Such a tapered roller bearing is assembled as follows (see FIG. 8). First, tapered rollers 92 are temporarily housed in pockets 91 of a cage 90 to obtain a cage assembly 95. The cage 90 (pockets 91) is configured such that portions of cage bars 93 of the cage 90 contact the tapered rollers 92 from the radially outer side in order to prevent the tapered rollers 92 from slipping radially outward out of the pockets 91. As illustrated in FIG. 8, the cage assembly 95 is moved in the axial direction to approach an inner ring 96 from a small rib portion 97 side, and further moved in the axial direction. Consequently, the tapered rollers 92 of the cage assembly 95 climb over the small rib portion 97 to be fitted on an inner raceway surface 99 formed between the small rib portion 97 and a large rib portion 98.

A diameter D8 of a circle inscribed in the plurality of tapered rollers 92, which is included in the cage assembly 95, on the small diameter side (right side in FIG. 8) is smaller than a diameter D9 of an outer peripheral surface 97a of the small rib portion 97 (D8<D9). This is to prevent the tapered rollers 92 from slipping off in the axial direction using the small rib portion 97 when the tapered roller bearing is completed. Therefore, the tapered rollers 92 are pressed radially outward by the small rib portion 97 to be deformed when the tapered rollers 92 of the cage assembly 95 climb over the small rib portion 97. Consequently, the cage 90 is elastically deformed such that the diameter thereof is increased.

In this way, the tapered rollers 92 climb over the small rib portion 97 to make sliding contact when the cage assembly 95 and the inner ring 96 are assembled to each other. In the meantime, the tapered rollers 92 are strongly pressed against the small rib portion 97 by an elastic restoring force of the cage 90. Therefore, it is highly likely that the outer peripheral surfaces of the tapered rollers 92 are damaged. The outer peripheral surfaces of the tapered rollers 92 serve as rolling contact surfaces that make rolling contact with the inner ring 96 and an outer ring. Thus, the bearing performance may be lowered, or the bearing life may be reduced, if the outer peripheral surfaces are damaged.

Thus, there is proposed a method in which a cage assembly 95 and an inner ring 96 are assembled to each other using a jig 100 as described in Japanese Patent Application Publication No. 2016-53422 (JP 2016-53422 A) (see FIG. 9). The jig 100 is provided adjacent to a small rib portion 97 of the inner ring 96. A tapered surface 101, the diameter of which is increased toward the small rib portion 97, is provided at the outer periphery of the jig 100.

The method described in JP 2016-53422 A is as follows. First, the cage assembly 95 is moved in the axial direction with respect to the jig 100 and the inner ring 96. Tapered rollers 92 of the cage assembly 95 slide along the tapered surface 101 of the jig 100. Consequently, the tapered rollers 92 are gradually pressed radially outward to increase the diameter of a cage 90. After that, the tapered rollers 92 pass over the small rib portion 97 to be fitted on an inner raceway surface 99. This enables assembly without damaging the outer peripheral surfaces (rolling contact surfaces) of the tapered rollers 92.

However, the rigidity of the cage 90 may be high, depending on the material or the structure (sectional shape) of the cage 90. In this case, the cage 90 is not easily elastically deformable during the assembly described above, and the tapered rollers 92 of the cage assembly 95 strongly contact the tapered surface 101 of the jig 100. In particular, the tapered rollers 92 have convex curved surfaces, the tapered surface 101 of the jig 100 also has a convex curved surface, and thus the manner of contact between the tapered rollers 92 and the tapered surface 101 is close to point contact. When the tapered rollers 92 and the tapered surface 101 configured in this way strongly contact each other, a very high surface pressure is generated, and even the outer peripheral surfaces (rolling contact surfaces) of the tapered rollers 92 are deformed. As a result, the bearing performance may be lowered, or the bearing life may be reduced.

SUMMARY OF THE INVENTION

An object of the present invention is to prevent damage to a plurality of tapered rollers included in a cage assembly by lowering a surface pressure generated on the tapered rollers when the cage assembly is assembled to an inner ring.

An aspect of the present invention provides a method of assembling a tapered roller bearing that includes an inner ring, an outer ring, tapered rollers interposed between the inner ring and the outer ring, and an annular cage in which a plurality of pockets that hold the tapered rollers are formed in a circumferential direction, the method including: the steps of (a) constituting a cage assembly in which the tapered rollers are temporarily housed in the pockets so as not to slip off radially outward; (b) constituting an inner ring assembly by moving the cage assembly in an axial direction to approach the inner ring from a side near a cone front face rib portion of the inner ring, and causing the tapered rollers of the cage assembly to climb over the cone front face rib portion to be fitted with an inner raceway surface of the inner ring; and (c) assembling the inner ring assembly and the outer ring to each other to obtain the tapered roller bearing. In the method: a jig is provided adjacent to the cone front face rib portion in step (b), the jig having an outer peripheral shape that is continuous with an outer peripheral surface of the cone front face rib portion, and including recessed grooves that are formed in an outer peripheral portion of the jig and that enable contact of the respective tapered rollers, the recessed grooves each having an inclined shape in which a groove bottom extends radially outward as the recessed groove extends toward one side in the axial direction, which is a cone front face rib portion side, and having a recessed arcuate shape in cross section; and in step (b), further, the cage assembly is relatively moved toward one side in the axial direction between the inner ring and the jig to increase a diameter of the cage by sliding the tapered rollers of the cage assembly radially outward along the recessed grooves so that the tapered rollers climb over the cone front face rib portion to be fitted on the inner raceway surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
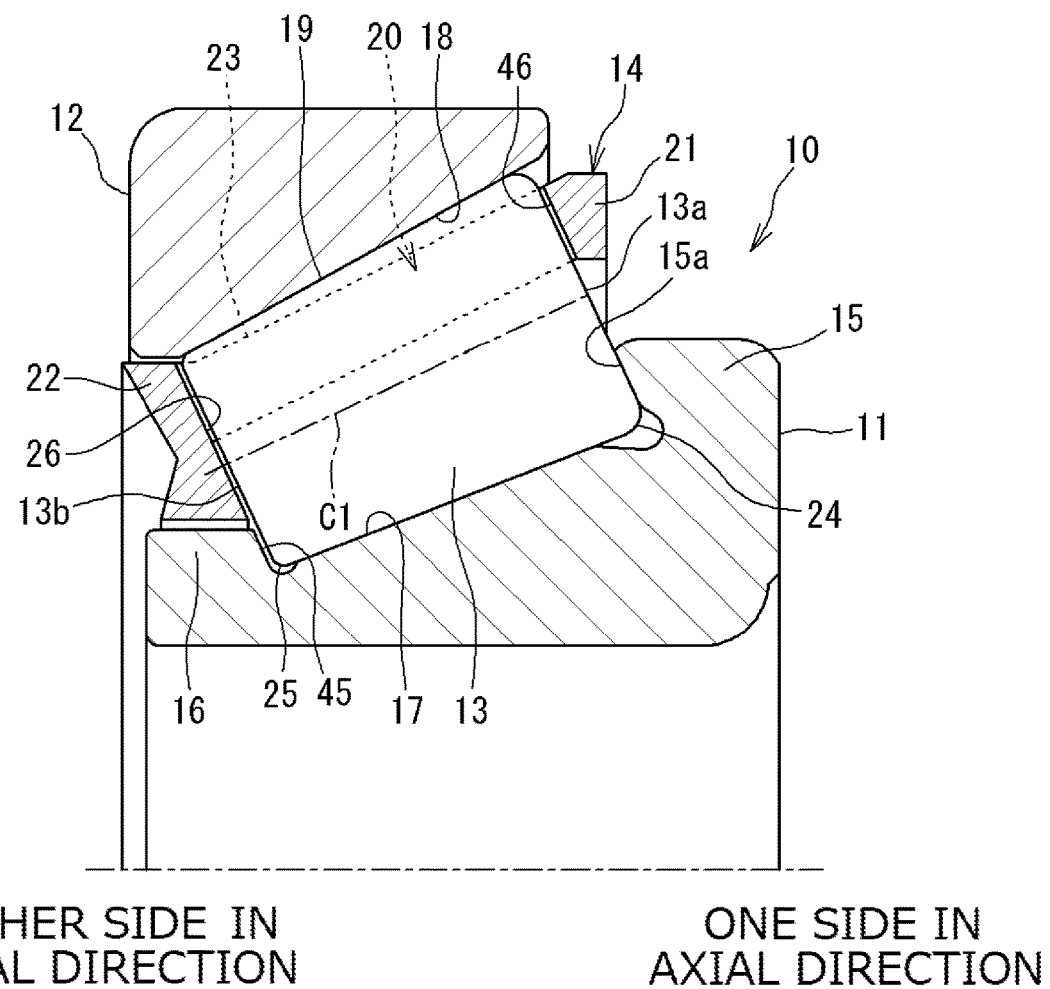
FIG. 1 is a sectional view of a tapered roller bearing.

FIG. 1 is a sectional view of a tapered roller bearing 10. The tapered roller bearing 10 includes an inner ring 11, an outer ring 12, a plurality of tapered rollers 13, and an annular cage 14. The inner ring 11 has a cone back face rib portion (hereinafter referred to as a "large rib portion") 15 on one side in the axial direction (right side in FIG. 1), and a cone front face rib portion (hereinafter referred to as a "small rib portion") 16 on the other side in the axial direction (left side in FIG. 1). An inner raceway surface 17 is formed between the large rib portion 15 and the small rib portion 16. The inner raceway surface 17 has a tapered shape in which the inner raceway surface 17 is reduced in diameter toward the small rib portion 16. An outer raceway surface 18 is formed on the inner peripheral side of the outer ring 12. The outer raceway surface 18 has a tapered shape in which the outer raceway surface 18 is reduced in diameter toward the other side in the axial direction. An outer peripheral surface 19 of each tapered roller 13 has a tapered shape. The tapered rollers 13 are interposed between the inner ring 11 (inner raceway surface 17) and the outer ring 12 (outer raceway surface 18).

The large rib portion 15 and the small rib portion 16, which are provided on both sides of the inner raceway surface 17 in the axial direction, project radially outward from the inner raceway surface 17. The small rib portion 16 and the large rib portion 15 hold the tapered rollers 13 therebetween to prevent the tapered rollers 13 from slipping off in the axial direction. The tapered roller bearing 10 can support an axial load with roller large end faces 13a of the tapered rollers 13 contacting a side surface 15a of the large rib portion 15.

The outer peripheral surfaces 19 of the tapered rollers 13 serve as rolling contact surfaces that make rolling contact with the inner raceway surface 17 and the outer raceway surface 18. A chamfered portion 24 is formed between the outer peripheral surface 19 and the roller large end face 13a. A chamfered portion 25 is formed between the outer peripheral surface 19 and a roller small end face 13b. The chamfered portions 24 and 25 have a convex curved surface shape (convex rounded shape) in a sectional surface that includes a center line C1 of the tapered roller 13.

The cage 14 has an annular shape as a whole, and is made of a resin. A plurality of pockets 20 is formed in the cage 14 in the circumferential direction. The pockets 20 house the respective tapered rollers 13. The cage 14 has a large annular portion 21, a small annular portion 22, and cage bars 23. The large annular portion 21 is provided on one side of the tapered rollers 13 in the axial direction. The small annular portion 22 is provided on the other side of the tapered rollers 13 in the axial direction.

The cage bars 23 connect the large annular portion 21 and the small annular portion 22 to each other. Spaces between the large annular portion 21 and the small annular portion 22 and between the cage bars 23 which are adjacent to each other in the circumferential direction serve as the pockets 20. In the cage 14 according to the present embodiment, a minute gap is formed between the small annular portion 22 and the inner ring 11, and a minute gap is also formed between the small annular portion 22 and the outer ring 12, in order to prevent entry of excessive lubricating oil from the other side in the axial direction (left side in FIG. 1) into a space between the inner ring 11 and the outer ring 12. Consequently, the sectional area of the small annular portion 22 is large (larger than the sectional area of the large annular portion 21). Therefore, although the cage 14 is made of a resin and elastically deformable, the cage 14 is not easily elastically deformable particularly on the small diameter side (on the small annular portion 22 side). An axially inner side surface 26 of the small annular portion 22 faces the roller small end faces 13a of the tapered rollers 13. An axially inner side surface 45 of the small rib portion 16 and the axially inner side surface 26 of the small annular portion 22 are positioned to be generally flush with each other (on the same line). An axially inner side surface 46 of the large annular portion 21 faces the roller large end faces 13a of the tapered rollers 13. The axially inner side surface (side surface 15a) of the large rib portion 15 and the axially inner side surface 46 of the large annular portion 21 are positioned to be generally flush with each other (on the same line).

Figure 2:
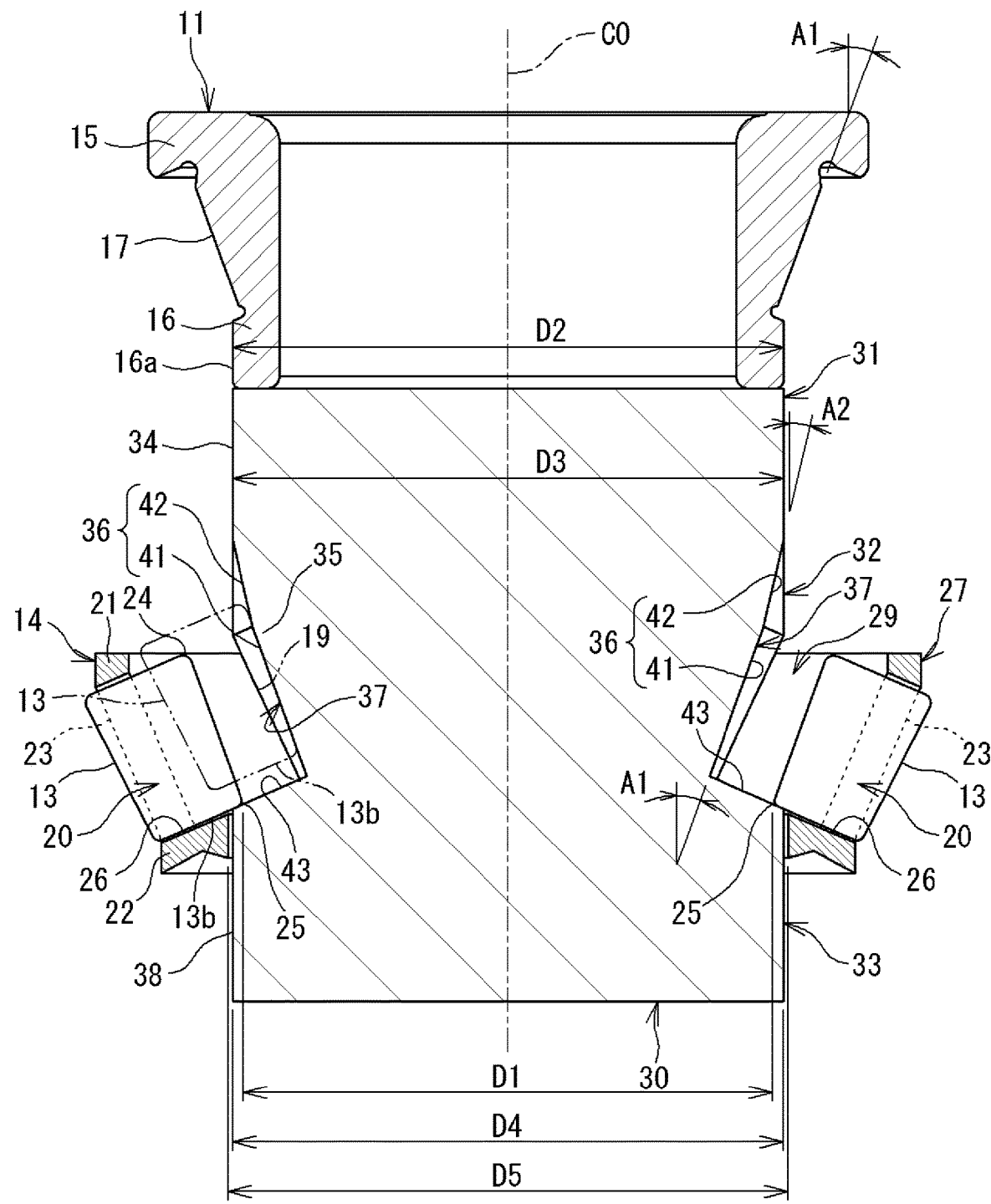
FIG. 2 is a sectional view of an inner ring, a jig, and a cage assembly.
Figure 3:
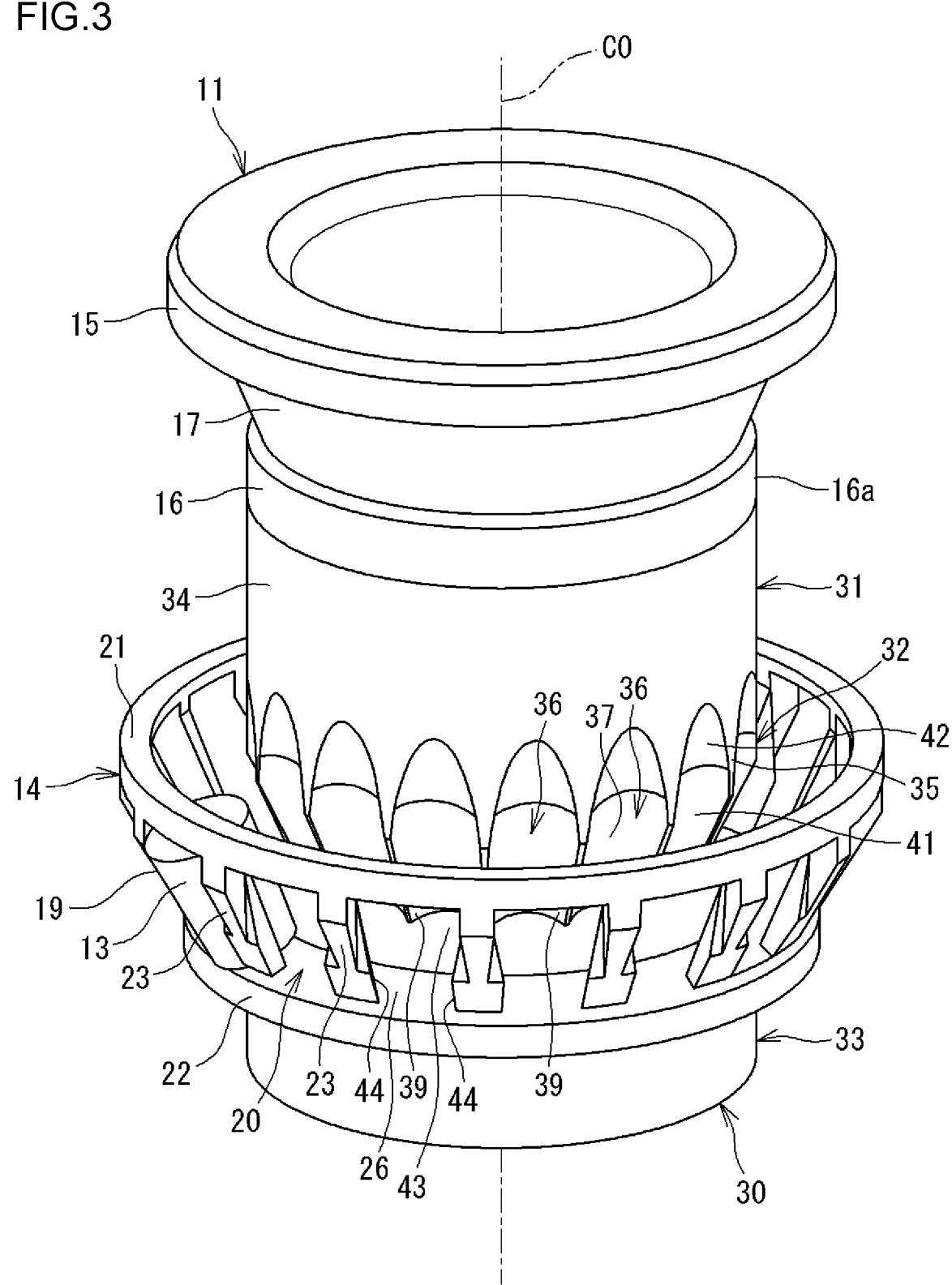
FIG. 3 is a perspective view of the inner ring, the jig, and the cage assembly.
Figure 6:
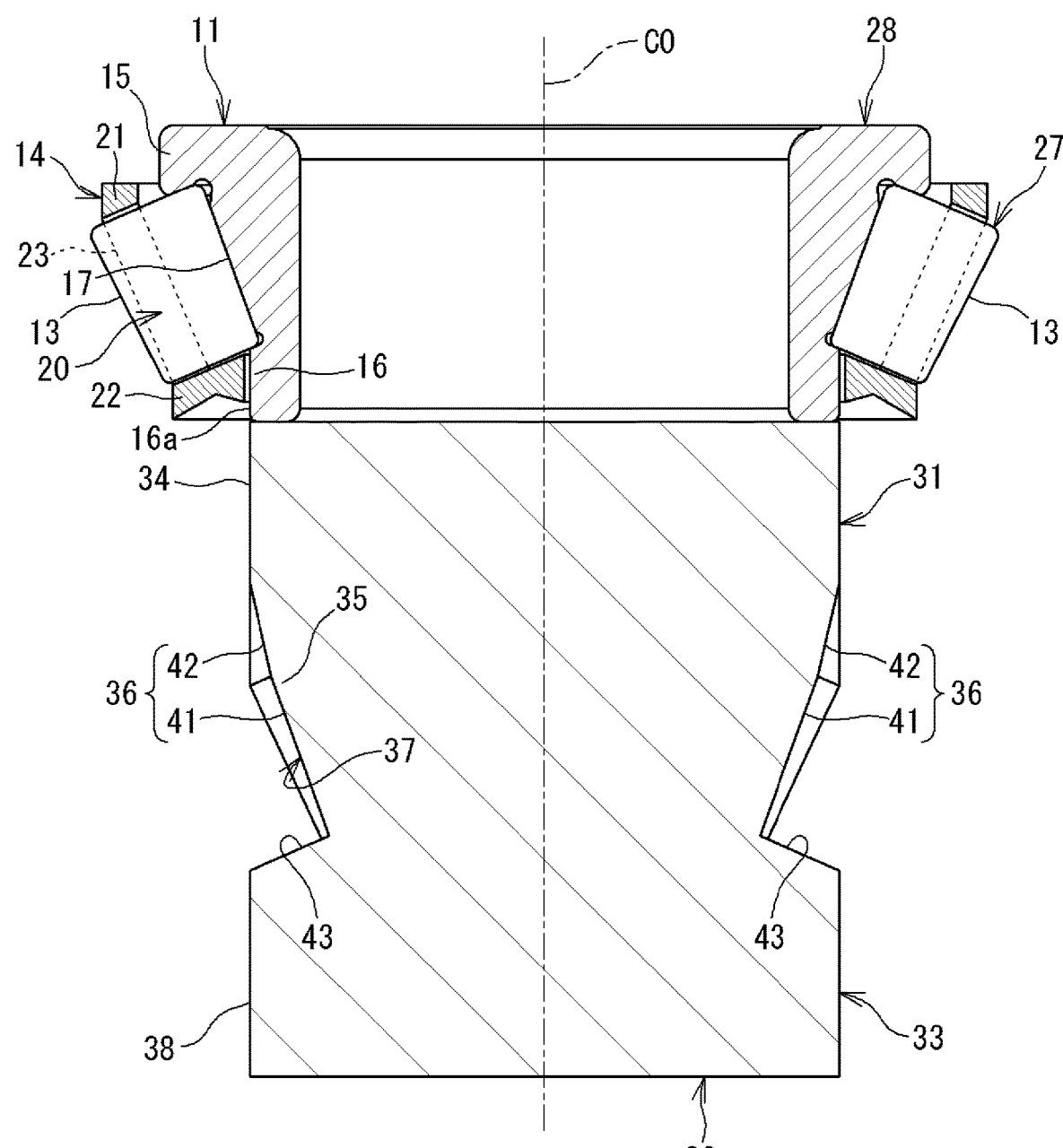
FIG. 6 is a sectional view of an inner ring assembly and the jig.

A method of assembling the tapered roller bearing 10 configured as described above will be described. First, an overview of the assembly method will be described. As illustrated in FIG. 2, the tapered rollers 13 are temporarily housed in the pockets 20 of the cage 14 (first step). The cage 14 in which the tapered rollers 13 are housed in all the pockets 20 is referred to as a "cage assembly 27". As illustrated in FIG. 6, the cage assembly 27 and the inner ring 11 are assembled to each other (second step). An assembly in which the cage assembly 27 and the inner ring 11 are assembled to each other is referred to as an "inner ring assembly 28". Finally, the inner ring assembly 28 and the outer ring 12 are assembled to each other (third step), completing the tapered roller bearing 10 (see FIG. 1). In the first step and the second step, a jig 30 illustrated in FIGS. 2 and 3 is used, and the assembly is performed with a center line C0 of the inner ring 11 and the jig 30 defined as the vertical direction.

The cage assembly 27 and the inner ring assembly 28 will be described. In the first step (see FIG. 2), the pockets 20 are shaped so as to enable the tapered rollers 13 to be mounted from the radially inner side, but so as not to enable the tapered rollers 13 to be mounted from the radially outer side. This is to prevent the tapered rollers 13 which are housed in the pockets 20 from slipping off radially outward in the cage assembly 27 (inner ring assembly 28 illustrated in FIG. 6). Specifically, the cage 14 (pockets 20) is configured such that portions 44 (see FIG. 3) of the cage bars 23 of the cage 14 contact the tapered rollers 13 from the radially outer side.

In the cage assembly 27, as illustrated in FIG. 2, a diameter D1 of a circle inscribed in the plurality of tapered rollers 13 on the small diameter side (lower side in FIG. 2) is smaller than a diameter D2 of an outer peripheral surface 16a of the small rib portion 16 (D1<D2). This is to prevent the tapered rollers 13 from slipping off in the axial direction using the small rib portion 16 when the inner ring assembly 28 (FIG. 6) and the tapered roller bearing 10 are completed (FIG. 1). As described later, assembly (fitting) between the cage assembly 27 and the inner ring 11 is performed by moving the cage assembly 27 and the inner ring 11 in the axial direction to approach each other. In the middle of the assembly, the tapered rollers 13 of the cage assembly 27 climb over the small rib portion 16 to be fitted on the inner raceway surface 17 which is formed between the small rib portion 16 and a large rib portion 15. In this event, it is necessary that the tapered rollers 13 should be displaced radially outward when climbing over the small rib portion 16 because of the relationship D1<D2 described above. Consequently, the cage 14 is pressed radially outward by the tapered rollers 13 to be elastically deformed such that the diameter thereof is increased.

In the assembly method according to the present embodiment, as described above and as illustrated in FIG. 2, the tapered rollers 13 are temporarily housed in the pockets 20 of the cage 14 so as not to slip off radially outward, constituting the cage assembly 27 (first step). The cage assembly 27 is moved in the axial direction to approach the inner ring 11 from the small rib portion 16 side (see FIG. 5). The tapered rollers 13 of the cage assembly 27 climb over the small rib portion 16 to be fitted on the inner raceway surface 17 of the inner ring 11 (see FIG. 6). Consequently, the inner ring assembly 28 is constituted (second step). The inner ring assembly 28 and the outer ring 12 are assembled to each other, completing the tapered roller bearing 10 illustrated in FIG. 1 (third step). The inner ring assembly 28 and the outer ring 12 can be assembled to each other by moving the inner ring assembly 28 and the outer ring 12 along the axial direction to approach each other.

The jig 30 will be described. As illustrated in FIGS. 2 and 3, the jig 30 is a shaft-like member, and is made of steel, for example. The jig 30 is disposed concentrically with the inner ring 11, and the center line of the jig 30 coincides with the center line C0 of the inner ring 11. The jig 30 according to the present embodiment has a transfer shaft portion 31, a guide shaft portion 32, and a temporary assembly shaft portion 33, which are arranged in this order from one side in the axial direction, that is, the small rib portion 16 side (from the upper side in FIGS. 2 and 3).

The transfer shaft portion 31 has a shaft shape, and is brought into abutment with the small rib portion 16 in the axial direction. An outer peripheral surface 34 of the transfer shaft portion 31 is constituted as a cylindrical surface centered on the center line C0. A diameter D3 of the outer peripheral surface 34 is equal to the diameter D2 of the outer peripheral surface 16a of the small rib portion 16. In the present embodiment, the diameter D2 of the outer peripheral surface 16a of the small rib portion 16 is constant along the axial direction, but may be varied. In this case, it is only necessary that the diameter of the outer peripheral surface 16a at an end portion near the jig 30 and the diameter of the outer peripheral surface 34 of the transfer shaft portion 31 at an end portion near the inner ring 11 should be equal to each other. That is, the transfer shaft portion 31 has an outer peripheral shape (outer peripheral surface 34) that is continuous with the outer peripheral surface 16a of the small rib portion 16.

Figure 5:
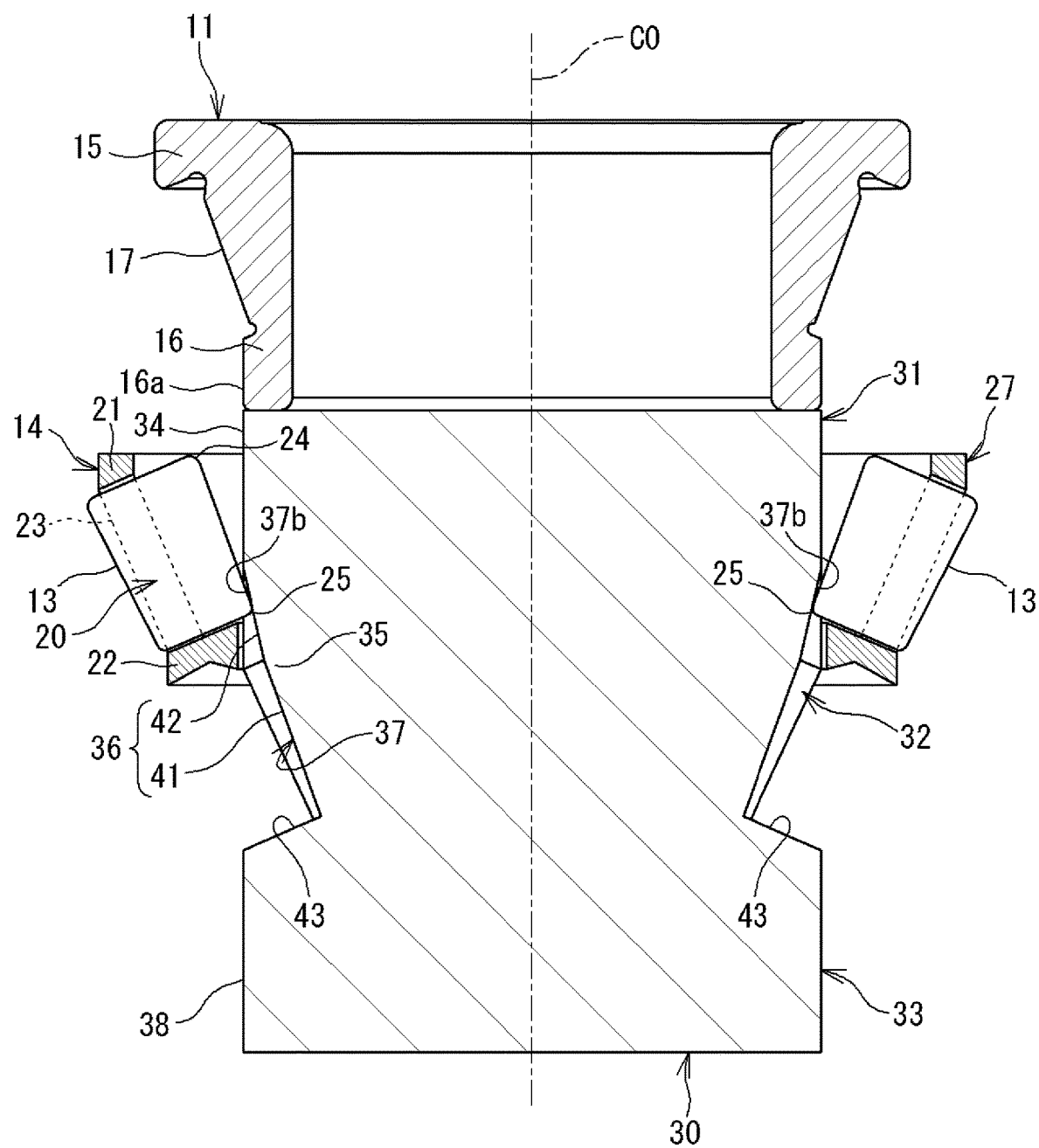
FIG. 5 is a sectional view of the inner ring, the jig, and the cage assembly.

The guide shaft portion 32 has a shaft shape, and has an outer peripheral portion 35 in which a plurality of recessed grooves 36 is formed. The number of the recessed grooves 36 is equal to the number of the tapered rollers 13 (and the pockets 20). The recessed grooves 36 are formed at equal intervals in the circumferential direction (see FIG. 3). The recessed grooves 36 are formed such that the direction of the groove width matches the circumferential direction. In FIG. 2, the tapered roller 13 indicated by the long dashed double-short dashed line corresponds to the tapered roller 13 before being temporarily housed in the pocket 20, and the tapered roller 13 indicated by the continuous line corresponds to the tapered roller 13 which is temporarily housed in the pocket 20. As indicated by the tapered roller 13 indicated by the long dashed double-short dashed line, the outer peripheral surface 19 of the tapered roller 13 can contact the recessed groove 36. As illustrated in FIG. 5, the chamfered portion 25 of the tapered roller 13 can contact the recessed groove 36. The recessed grooves 36 serve as guides that enable contact of the respective tapered rollers 13 to guide the tapered rollers 13.

Figure 4:
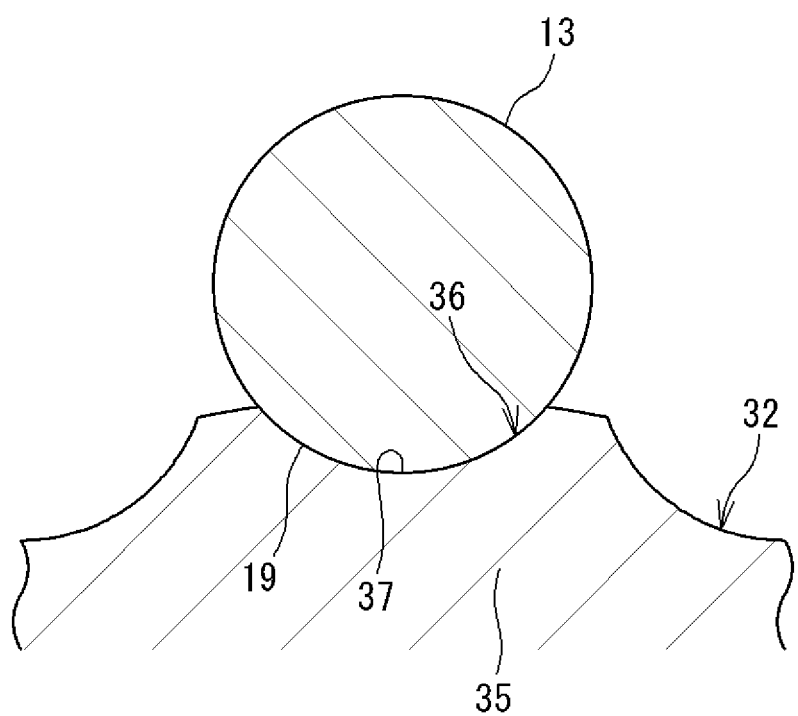
FIG. 4 is a sectional view of the outer peripheral portion of a guide shaft portion, in which recessed grooves are formed, as seen in the axial direction.

The recessed grooves 36 each have an inclined shape in which a groove bottom 37 extends radially outward as the recessed groove 36 extends toward one side in the axial direction, which is the small rib portion 16 side, as illustrated in FIG. 2, and have a recessed arcuate cross-sectional shape as illustrated in FIG. 4. FIG. 4 is a cross-sectional view of the outer peripheral portion 35 of the guide shaft portion 32, in which the recessed grooves 36 are formed, as seen in the axial direction.

As illustrated in FIGS. 2 and 3, the recessed grooves 36 each have a first groove portion 41 on the other side in the axial direction, and a second groove portion 42 on one side in the axial direction. The first groove portion 41 has a shape along a tapered surface (a conical surface in which the radius of curvature of the recessed arcuate shape becomes smaller) that is tapered toward the other side in the axial direction.

The shape of the tapered surface can be the same as that of the outer peripheral surface 19 of the tapered roller 13, and (a part of) the tapered roller 13 can be fitted in the first groove portion 41. The second groove portion 42 is shaped along a cylindrical surface, and provided on one side in the axial direction with respect to the first groove portion 41 to be continuous with the first groove portion 41. In FIG. 2, an inclination angle A1 of the first groove portion 41 with respect to the axial direction and an inclination angle A2 of the second groove portion 42 with respect to the axial direction are different from each other. The inclination angle A2 of the second groove portion 42 is smaller than the inclination angle A1 of the first groove portion 41 (A2<A1). In FIG. 2, the inclination angles A1 and A2 are each an angle at the groove bottom (37), and an angle between a line that connects portions of the groove bottom 37 (positions in the circumferential direction at which the recessed groove 36 is deepest) in the axial direction of the recessed groove 36 and a line that is parallel to the center line C0. The inclination angle A1 of the first groove portion 41 is set to be equal to the inclination angle of the inner raceway surface 17 of the inner ring 11.

The recessed grooves 36 each have a guide surface 43 that is provided on the other side in the axial direction and that faces the roller small end face 13a of the tapered roller 13. The guide surface 43 has a shape along a virtual surface extended radially inward from the axially inner side surface 26 of the small annular portion 22 of the cage 14 which is externally fitted to the temporary assembly shaft portion 33. That is, the axially inner side surface 26 of the cage 14 and the guide surface 43 of the jig 30 have the same inclination angle with respect to the axial direction. The axially inner side surface 26 and the guide surface 43 can be positioned on the same plane with the small annular portion 22 externally fitted to the temporary assembly shaft portion 33.

The temporary assembly shaft portion 33 has a shaft shape. An outer peripheral surface 38 of the temporary assembly shaft portion 33 is constituted as a cylindrical surface centered on the center line C0. The outer peripheral surface 38 is positioned on the other side in the axial direction with respect to the recessed grooves 36, and is concentric with the outer peripheral portion 35 of the guide shaft portion 32 in which the recessed grooves 36 are formed. In the first step, the small annular portion 22 of the cage 14 is externally fitted to the outer peripheral surface 38 of the temporary assembly shaft portion 33 via a gap. Consequently, the cage 14 can be centered (aligned) with reference to the jig 30. In order to secure the gap, a diameter D4 of the outer peripheral surface 38 is set to be smaller than a bore diameter D5 of the small annular portion 22. The diameter D4 of the outer peripheral surface 38 may be equal to the diameter D2 of the outer peripheral surface 16a of the small rib portion 16 (D4=D2), but may be slightly smaller than the diameter D2 of the outer peripheral surface 16a (D4<D2). An annular space 29 that enables insertion of the tapered rollers 13 is formed between the outer peripheral portion 35 of the jig 30, in which the recessed grooves 36 are formed, and the cage 14 in a temporary assembly state in which the small annular portion 22 is externally fitted to the temporary assembly shaft portion 33.

A specific example of an assembly method performed using the jig 30 configured as described above will be described. As illustrated in FIG. 2, the jig 30 is provided adjacent to the small rib portion 16 of the inner ring 11 with the center line C0 of the inner ring 11 and the jig 30 defined as the vertical direction. The cage 14 is fitted to the jig 30 from an end portion on the other side in the axial direction, and the small annular portion 22 of the cage 14 is positioned on the radially outer side of the temporary assembly shaft portion 33. Consequently, the cage 14 is centered with respect to the jig 30 and the inner ring 11. The recessed grooves 36 of the jig 30 and the pockets 20 of the cage 14 are brought into phase with each other.

In this state, the annular space 29 is formed between the outer peripheral portion 35 of the guide shaft portion 32 and the cage 14, and the tapered rollers 13 are inserted into the annular space 29 (as indicated by the long dashed double-short dashed line in FIG. 2). The tapered rollers 13 in the annular space 29 are positioned in the circumferential direction as fitted in the recessed grooves 36. The tapered rollers 13 are also positioned by the recessed grooves 36 in the axial direction by contacting the guide surface 43. The tapered rollers 13 are moved radially outward along the guide surfaces 43 to be housed (temporarily housed) in the pockets 20. Consequently, the cage assembly 27 can be obtained. In the present embodiment, the center line C0 matches the vertical direction, and the tapered rollers 13 which are temporarily housed in the pockets 20 are maintained as positioned between the large annular portion 21 and the small annular portion 22 of the cage 14. The first step has thus been finished.

The cage assembly 27 is moved relative to the jig 30 and the inner ring 11 toward one side in the axial direction with the tapered rollers 13 temporarily housed in all the pockets 20. The tapered rollers 13 of the cage assembly 27 eventually contact the recessed grooves 36, further slide along the recessed grooves 36, and are pressed radially outward by the groove bottoms 37 of the recessed grooves 36 (see FIG. 5). In the cage assembly 27, as described above, the cage bars 23 (portions 44 thereof; see FIG. 3) of the cage 14 contact the tapered rollers 13 from the radially outer side. Consequently, the tapered rollers 13 are not movable radially outward from the pockets 20. Therefore, the cage assembly 27 is moved toward one side in the axial direction while the cage 14 is pressed by the tapered rollers 13, which are directed radially outward, to be elastically deformed such that the diameter of the cage 14 is increased. When the tapered rollers 13 which are temporarily housed in the pockets 20 are linearly moved toward one side in the axial direction as the cage assembly 27 is advanced, the chamfered portions 25 of the tapered rollers 13 contact the second groove portions 42 of the recessed grooves 36 to slide over the second groove portions 42.

When the chamfered portions 25 of the tapered rollers 13 slide over the second groove portions 42 and climb over the second groove portions 42, the chamfered portions 25 go on to slide over the outer peripheral surface 34 of the transfer shaft portion 31. Relative movement between the cage assembly 27 and the jig 30 and the inner ring 11 is continued. When the chamfered portions 25 of the tapered rollers 13 slide over the outer peripheral surface 16a of the small rib portion 16 of the inner ring 11 and climb over the small rib portion 16, the cage 14 is reduced in diameter by an elastic restoring force, and the tapered rollers 13 are fitted on the inner raceway surface 17 as illustrated in FIG. 6. Consequently, the inner ring assembly 28 can be obtained. In this state, the tapered rollers 13 do not slip off radially outward or toward either side in the axial direction, and the cage 14 is restrained by the tapered rollers 13 and does not slip off from the inner ring 11. The second step has thus been finished.

To assemble the inner ring assembly 28 and the outer ring 12 (see FIG. 1) to each other, it is only necessary to detach the jig 30 from the inner ring 11, move the inner ring assembly 28 and the outer ring 12 along the axial direction to approach each other, and dispose the outer ring 12 on the radially outer side of the tapered rollers 13. The third step has thus been finished. Consequently, the tapered roller bearing 10 is completed.

In the assembly method according to the present embodiment, as described above, the jig 30 is provided adjacent to the small rib portion 16 of the inner ring 11 (see FIG. 2). The tapered rollers 13 are temporarily housed in the pockets 20 of the cage 14, which has been fitted to the jig 30 (temporary assembly shaft portion 33), to obtain the cage assembly 27 (first step). The cage assembly 27 is relatively moved toward one side in the axial direction between the inner ring 11 and the jig 30, and the tapered rollers 13 of the cage assembly 27 are slid radially outward along the recessed grooves 36. Consequently, the diameter of the cage 14 is increased (see FIG. 5), and the tapered rollers 13 climb over the small rib portion 16 to be fitted on the inner raceway surface 17 (second step).

Figure 9:
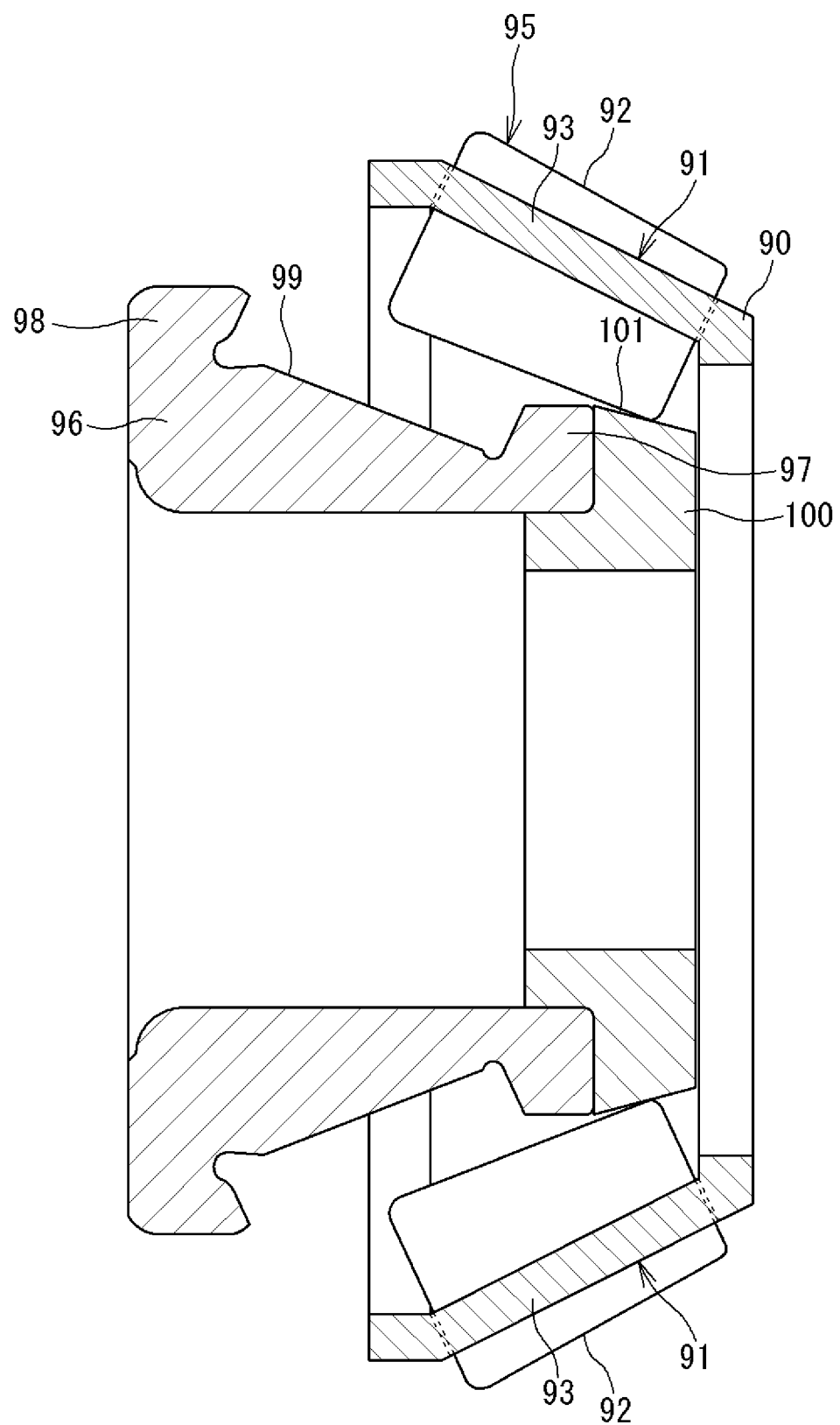
FIG. 9 is a sectional view illustrating another assembly method according to the related art.

In the assembly method, the tapered rollers 13 of the cage assembly 27 slide along the recessed grooves 36 of the jig 30 in the second step. In this event, as described above, the recessed grooves 36 each have an inclined shape in which the groove bottom 37 extends radially outward as the recessed groove 36 extends toward one side in the axial direction, which is the small rib portion 16 side, and have a recessed arcuate cross-sectional shape (see FIG. 4). Consequently, as illustrated in FIG. 5, the tapered rollers 13 are pressed radially outward by the recessed grooves 36 to gradually elastically increase the diameter of the cage 14. That is, the cage 14 is elastically pressed radially outward by the recessed grooves 36. The tapered rollers 13 are pressed against the recessed grooves 36 as the diameter of the cage 14 is increased. The recessed grooves 36 each have an arcuate cross-sectional shape. Therefore, the manner of contact between the tapered roller 13 and the recessed groove 36 is contact between a projected curved surface and a recessed curved surface. Therefore, the area of contact between the tapered roller 13 and the recessed groove 36 is larger than that in the example according to the related art illustrated in FIG. 9. Consequently, a surface pressure generated between the tapered roller 13 and the recessed groove 36 is lowered. As a result, it is possible to prevent the outer peripheral surfaces 19 of the tapered rollers 13 from being damaged.

In the second step, the tapered rollers 13 of the cage assembly 27 contact the second groove portions 42 relatively strongly because of a reaction force of the cage 14, the diameter of which is elastically increased. Thus, the tapered rollers 13 contact the second groove portions 42 at the chamfered portions 25. This is because, in the completed tapered roller bearing 10, as illustrated in FIG. 1, the chamfered portions 25 are not included in the rolling contact surfaces of the tapered rollers 13 and do not contact the inner raceway surface 17 and the outer raceway surface 18. That is, the contact surface pressure is lower than that in the example according to the related art as described above. Therefore, the bearing performance is not affected, even if the chamfered portions 25 are damaged, since the chamfered portions 25 are not included in the rolling contact surfaces of the tapered rollers 13. In the present embodiment, in order to cause the chamfered portions 25 to reliably contact the second groove portions 42, the inclination angle A2 of the second groove portions 42 is set to be small (smaller than the inclination angle A1 of the first groove portions 41) as described above (see FIG. 2). With this configuration, as illustrated in FIG. 5, the angle between the outer peripheral surface 19 of the tapered roller 13 and a groove bottom 37b of the second groove portion 42 can be made large as illustrated in FIG. 5. Therefore, the chamfered portions 25 of the tapered rollers 13 can be caused to reliably slide with respect to the second groove portions 42.

Figure 7A:
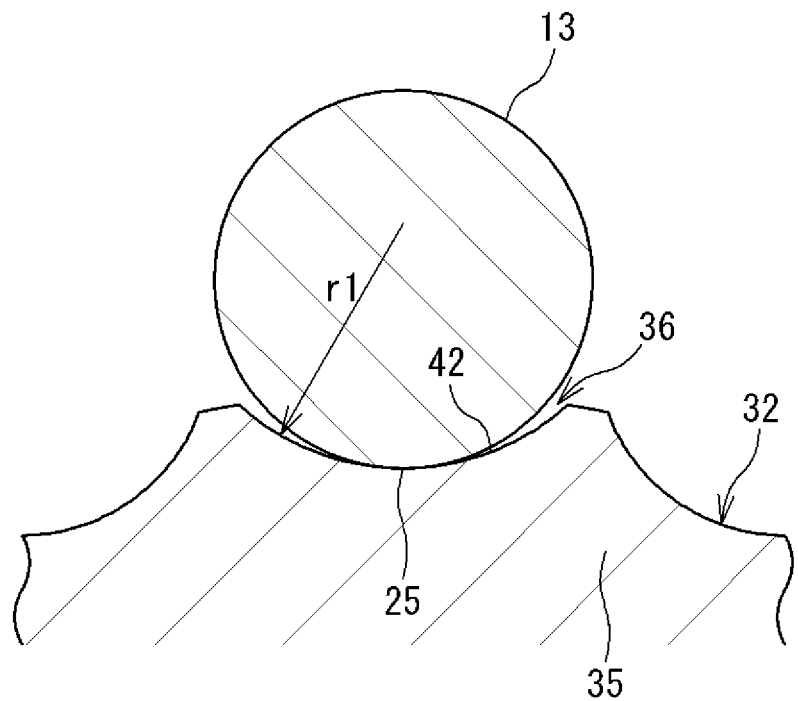
FIG. 7A is a sectional view of the outer peripheral portion of the guide shaft portion as seen in the axial direction.
Figure 7B:
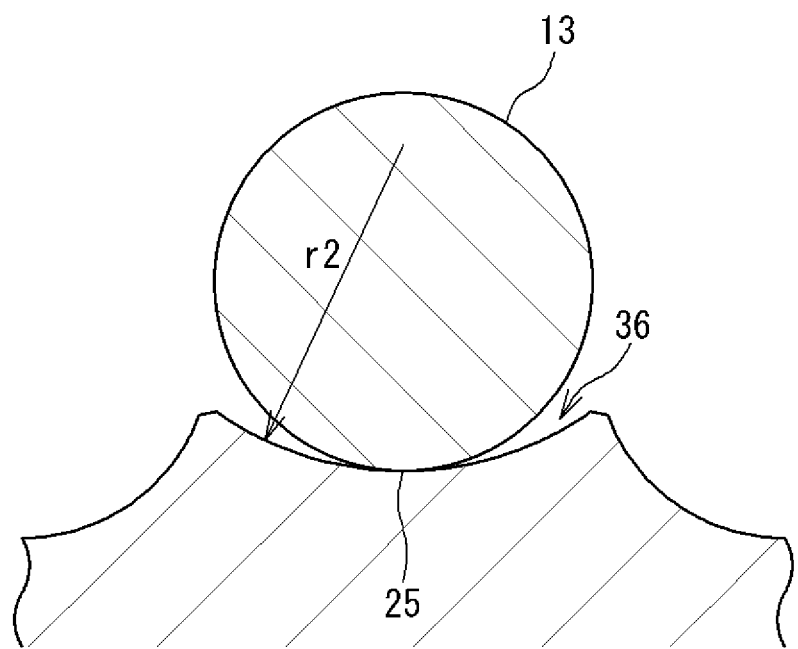
FIG. 7B is a sectional view illustrating recessed grooves in a different form.
Figure 8:
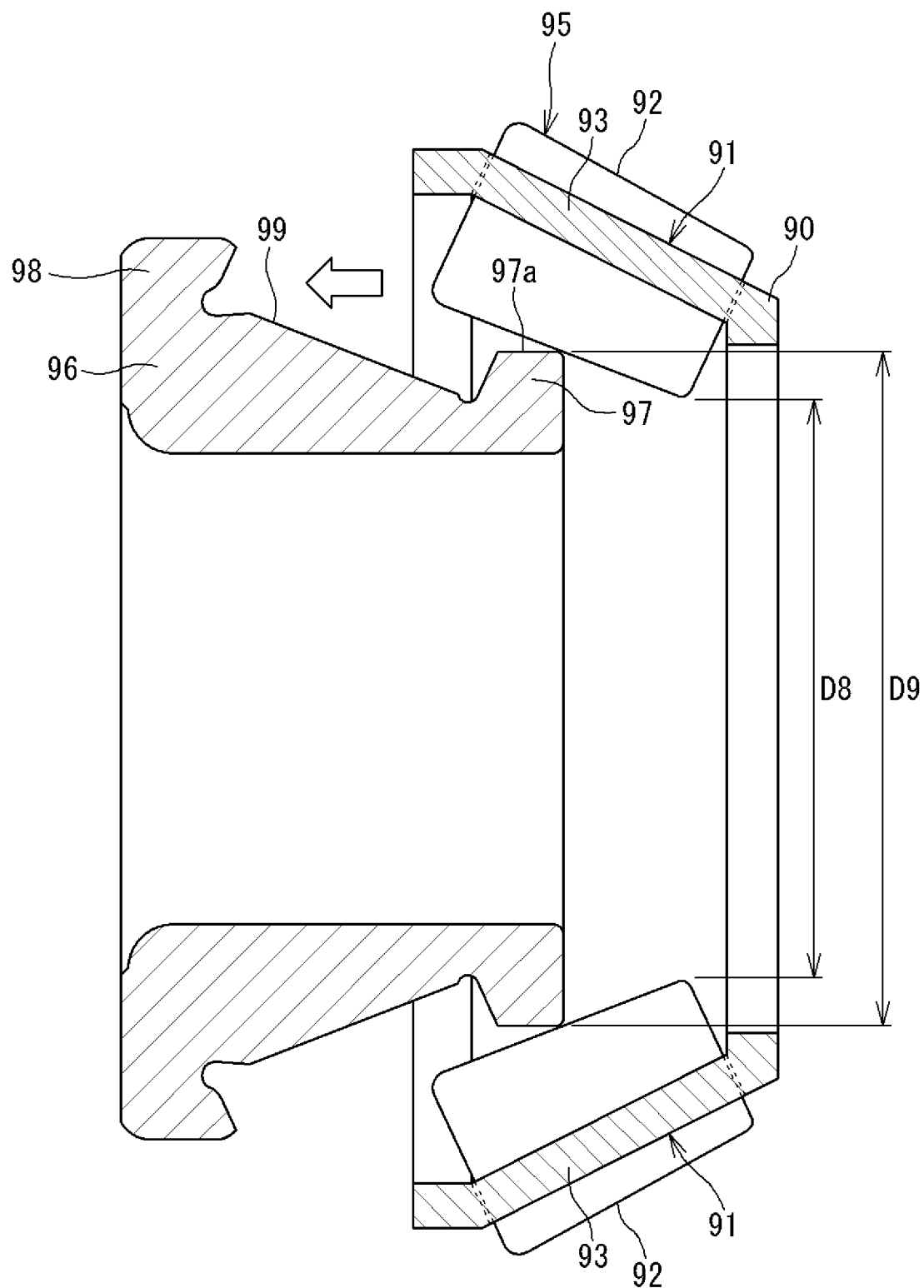
FIG. 8 is a sectional view illustrating an assembly method according to the related art.

Further, the chamfered portions 25 of the tapered rollers 13 of the cage assembly 27 slide over the second groove portions 42 to be guided in the second step. The second groove portions 42 are shaped along a cylindrical surface, and a radius of curvature r1 (see FIG. 7A) is constant. Therefore, the contact ellipse between the convex curved surface of the chamfered portion 25 of the tapered roller 13 and the concave curved surface of the recessed groove 36 can be prevented from becoming smaller. That is, it is possible to prevent a rise in surface pressure between the tapered roller 13 and the recessed groove 36 further effectively. In the case where the recessed grooves 36 are shaped along a single tapered surface (see FIG. 7B), a radius of curvature r2 becomes gradually larger toward one side in the axial direction (r2>r1) in a region in which the chamfered portions 25 slide over the recessed grooves 36. The contact ellipse between the tapered roller 13 and the recessed groove 36 tends to be smaller in the example illustrated in FIG. 7B than that in the present embodiment illustrated in FIG. 7A, and the contact surface pressure between the tapered roller 13 and the recessed groove 36 tends to be increased in the example illustrated in FIG. 7B. Thus, in the present embodiment, the second groove portions 42 are shaped along a cylindrical surface to prevent the radius of curvature r1 from becoming larger. As a result, a rise in surface pressure generated between the tapered roller 13 and the recessed groove 36 is prevented.

In the first step (see FIG. 2), the annular space 29 which enables insertion of the tapered rollers 13 is formed between the outer peripheral portion 35 of the jig 30, in which the recessed grooves 36 are formed, and the cage 14 in a temporary assembly state in which the small annular portion 22 is externally fitted to the temporary assembly shaft portion 33 of the jig 30. The tapered rollers 13 which are inserted into the annular space 29 are temporarily housed in the pockets 20 of the cage 14 from the radially inner side to obtain the cage assembly 27. When the tapered rollers 13 which are disposed in the annular space 29 are temporarily housed in the pockets 20, further, the tapered rollers 13 can be moved toward the pockets 20 on the radially outer side along the guide surfaces 43 of the recessed grooves 36.

In this way, the cage 14 can be centered (aligned) with respect to the jig 30 by externally fitting the small annular portion 22 of the cage 14 to the temporary assembly shaft portion 33 of the jig 30 in the first step. Further, in this temporary assembly state, it is possible to obtain the cage assembly 27 by inserting the tapered rollers 13 between the outer peripheral portion 35 of the jig 30 and the cage 14. The cage assembly 27 can be obtained easily by moving the tapered rollers 13, which are disposed in the annular space 29, radially outward along the guide surfaces 43 to be temporarily housed in the pockets 20. In the second step, the cage assembly 27 is moved relative to the jig 30 toward one side in the axial direction. Consequently, the inner ring assembly 28 can be obtained, providing good assembly workability.

In the jig 30, the first groove portions 41 of the recessed grooves 36 are shaped along a tapered surface that is tapered toward the other side in the axial direction, and are shaped so the tapered rollers 13 (portions thereof) are fitted in first groove portions 41. Therefore, in the first step, the tapered rollers 13 which are inserted into the annular space 29 are fitted in the first groove portions 41 to be stabilized, and can be brought into phase with the pockets 20. With the first groove portions 41 shaped along a tapered surface, as illustrated in FIG. 3, projected wall portions 39 that have sufficient height and distal end width (width on the radially outer side) are formed between the recessed grooves 36 which are adjacent to each other in the circumferential direction. The projected wall portions 39 having "sufficient height and distal end width" mean that the recessed grooves 36 which are adjacent to each other are clearly defined. The attitude of the tapered rollers 13 which are fitted in the recessed grooves 36 can be maintained with the projected wall portions 39 having sufficient height and distal end width all the way to the other side in the axial direction where the guide surfaces 43 are present. As a result, the projected wall portions 39 can be interposed such that the tapered rollers 13 which are adjacent to each other do not contact each other.

In the assembly method according to the present embodiment in which the jig 30 is used, as described above, the jig 30 has the recessed grooves 36 which guide the tapered rollers 13 of the cage assembly 27. The tapered rollers 13 are displaced radially outward while being guided by the recessed grooves 36 to increase the diameter of the cage 14 (FIG. 5), in order to finally climb over the small rib portion 16 of the inner ring 11. The tapered rollers 13 are pressed against the recessed grooves 36 by the reaction force of the cage 14. The recessed grooves 36 according to the present embodiment each have a recessed arcuate cross-sectional shape. Thus, the manner of contact between the tapered roller 13 (chamfered portion 25) and the recessed groove 36 is contact between a convex curved surface and a concave curved surface. Therefore, a low surface pressure is generated between the tapered roller 13 and the recessed groove 36. This prevents the spread of deformation etc. to the outer peripheral surface 19 through the chamfered portions 25 of the tapered rollers 13, making it possible to prevent the outer peripheral surface 19 from being damaged.

The embodiment disclosed above is exemplary in all respects, and not limiting. The jig 30 is not limited to the illustrated embodiment, and may be in other embodiments without departing from the scope of the present invention. For example, in the embodiment described above, the recessed grooves 36 are each configured to include the first groove portion 41 which is shaped along a tapered surface, and the second groove portion 42 which is shaped along a cylindrical surface. However, the recessed grooves 36 may be entirely shaped along a tapered surface, or may be entirely shaped along a cylindrical surface. In addition, the jig 30 may be shaped such that the guide shaft portion 32 directly contacts (is directly connected to) the small rib portion 16 with the transfer shaft portion 31 omitted.

With the present invention, it is possible to prevent the outer peripheral surfaces of the tapered rollers from being damaged when the cage assembly and the inner ring are assembled to each other during assembly of the tapered roller bearing.

What is claimed is:

1. A method of assembling a tapered roller bearing that includes an inner ring, an outer ring, a plurality of tapered rollers interposed between the inner ring and the outer ring, and an annular cage in which pockets that hold the tapered rollers are formed in a circumferential direction, the method comprising: the steps of
    (a) constituting a cage assembly in which the tapered rollers are temporarily housed in the pockets so as not to slip off radially outward;
    (b) constituting an inner ring assembly by moving the cage assembly in an axial direction to approach the inner ring from a side near a cone front face rib portion of the inner ring, and causing the tapered rollers of the cage assembly to climb over the cone front face rib portion to be fitted on an inner raceway surface of the inner ring; and
    (c) assembling the inner ring assembly and the outer ring to each other to obtain the tapered roller bearing, wherein:
    a jig is provided adjacent to the cone front face rib portion in step (b), the jig having an outer peripheral shape that is continuous with an outer peripheral surface of the cone front face rib portion, and including recessed grooves that are formed in an outer peripheral portion of the jig and that enable contact of the respective tapered rollers, the recessed grooves each having an inclined shape in which a groove bottom extends radially outward as the recessed groove extends toward one side in the axial direction, which is a cone front face rib portion side, and having a recessed arcuate shape in cross section; and
    in step (b), further, the cage assembly is relatively moved toward one side in the axial direction between the inner ring and the jig to increase a diameter of the cage by sliding the tapered rollers of the cage assembly radially outward along the recessed grooves so that the tapered rollers climb over the cone front face rib portion to be fitted on the inner raceway surface.

2. The method of assembling a tapered roller bearing according to claim 1, wherein:
    the jig has a temporary assembly shaft portion provided on the other side in the axial direction with respect to the recessed grooves, the temporary assembly shaft portion having an outer peripheral surface that is concentric with the outer peripheral portion in which the recessed grooves are formed, and allowing a small annular portion of the cage to be externally fitted to the temporary assembly shaft portion via a gap; and
    in step (a), the small annular portion is externally fitted to the temporary assembly shaft portion to establish a temporary assembly state, an annular space into which the tapered rollers are inserted is formed between the outer peripheral portion of the jig and the cage, and the tapered rollers which are inserted into the annular space are temporarily housed in the pockets of the cage from a radially inner side to obtain the cage assembly.

3. The method of assembling a tapered roller bearing according to claim 2, wherein
    the recessed grooves each have a guide surface provided on the other side in the axial direction, and shaped along a virtual surface extended radially inward from an axially inner side surface of the small annular portion which is externally fitted to the temporary assembly shaft portion.

4. The method of assembling a tapered roller bearing according to claim 1, wherein
    the recessed grooves each have a first groove portion shaped along a conical surface in which a radius of curvature of the recessed arcuate shape becomes smaller toward the other side in the axial direction, and a second groove portion shaped along a cylindrical surface and provided on one side in the axial direction with respect to the first groove portion to be continuous with the first groove portion.

5. The method of assembling a tapered roller bearing according to claim 4, wherein an inclination angle of the second groove portion with respect to the axial direction is smaller than an inclination angle of the first groove portion with respect to the axial direction.

6. The method of assembling a tapered roller bearing according to claim 1, wherein the jig is made of steel.

7. A jig that is used to assemble a tapered roller bearing that includes an inner ring, an outer ring, a plurality of tapered rollers interposed between the inner ring and the outer ring, and an annular cage in which pockets that hold the tapered rollers are formed in a circumferential direction, the tapered roller bearing being assembled by moving a cage assembly, in which the tapered rollers are temporarily housed in the pockets so as not to slip off radially outward, in an axial direction along the jig to approach the inner ring from a side near a cone front face rib portion of the inner ring, constituting an inner ring assembly by causing the tapered rollers of the cage assembly to climb over the cone front face rib portion to be fitted on an inner raceway surface of the inner ring, and assembling the inner ring assembly and the outer ring to each other to obtain the tapered roller bearing, the jig comprising:

an outer peripheral shape that (1) is continuous with an outer peripheral surface of the cone front face rib portion and (2) includes recessed grooves that are formed in an outer peripheral portion of the jig and that enable contact of the respective tapered rollers, wherein:

the recessed grooves each having an inclined shape in which a groove bottom extends radially outward as the recessed groove extends toward one side in the axial direction, which is a cone front face rib portion side, and having a recessed arcuate shape in cross section;

each of the recessed grooves having first and second groove portions; and the first groove portion and the second groove portion have different inclination angles.

8. The jig according to claim 7, wherein the jig is made of steel.

* * * * *